United States Patent
Upton

(10) Patent No.: US 7,156,434 B2
(45) Date of Patent: Jan. 2, 2007

(54) COOKING TOOL ASSEMBLY

(76) Inventor: Anthony Robert Upton, P.O. Box 110, Hillston, New South Wales (AU) 2675

( * ) Notice: Subject to any disclaimer, the term of this patent is extended or adjusted under 35 U.S.C. 154(b) by 0 days.

(21) Appl. No.: 10/485,098

(22) PCT Filed: Jul. 25, 2002

(86) PCT No.: PCT/AU02/00995

§ 371 (c)(1),
(2), (4) Date: Jan. 27, 2004

(87) PCT Pub. No.: WO03/011093

PCT Pub. Date: Feb. 13, 2003

(65) Prior Publication Data

US 2004/0173104 A1    Sep. 9, 2004

(30) Foreign Application Priority Data

Jul. 27, 2001 (AU) ............................ PR6630
Dec. 19, 2001 (AU) ............................ PR9572

(51) Int. Cl.
*A47G 21/10* (2006.01)
(52) U.S. Cl. ............ 294/3; 294/10; 7/109; 7/110; 7/112; 30/147; 30/148; 30/149; 30/150
(58) Field of Classification Search ............ 294/3, 294/7, 10, 16, 99.2; 30/147, 148, 149, 150; 7/109, 110, 112
See application file for complete search history.

(56) References Cited

U.S. PATENT DOCUMENTS

| | | | | |
|---|---|---|---|---|
| 1,145,060 A | * | 7/1915 | Duket | ............... 294/3 |
| 1,222,489 A | * | 4/1917 | Terzaghi | ............... 7/122 |
| 1,419,591 A | | 6/1922 | Stollerman | |
| 2,004,524 A | | 6/1935 | Foeckler, Sr. | |
| 4,809,435 A | | 3/1989 | Printz | |
| 5,056,173 A | | 10/1991 | Brincat | |
| 5,206,998 A | * | 5/1993 | Oriente et al. | ............... 30/142 |
| 5,791,053 A | | 8/1998 | Koong | |

FOREIGN PATENT DOCUMENTS

| | | |
|---|---|---|
| AU | 209415 | 1/1956 |
| AU | 294248 | 9/1966 |
| AU | 200165527 A1 | 3/2002 |
| CH | 684571 | 10/1994 |
| DE | 29921595 | 4/2000 |
| DE | 2004955 | 9/2000 |
| JP | 200000546 | 6/1998 |

* cited by examiner

*Primary Examiner*—Patrick Mackey
*Assistant Examiner*—Michael Lowe
(74) *Attorney, Agent, or Firm*—Gordon & Rees LLP

(57) ABSTRACT

A cooking tool assembly (10) is disclosed which includes a first cooking tool comprising tong means (14) having gripping means (17,18) located at one end of respective arms (15,16) the arms being distally pivotted at the other end, and second cooking tool (spatula (11) in this embodiment) associated with the tong means (14) proximate the other ends of the arms (15, 16) whereby the assembly constitutes a triple-ended reversible bi-functional cooking tool.

7 Claims, 6 Drawing Sheets

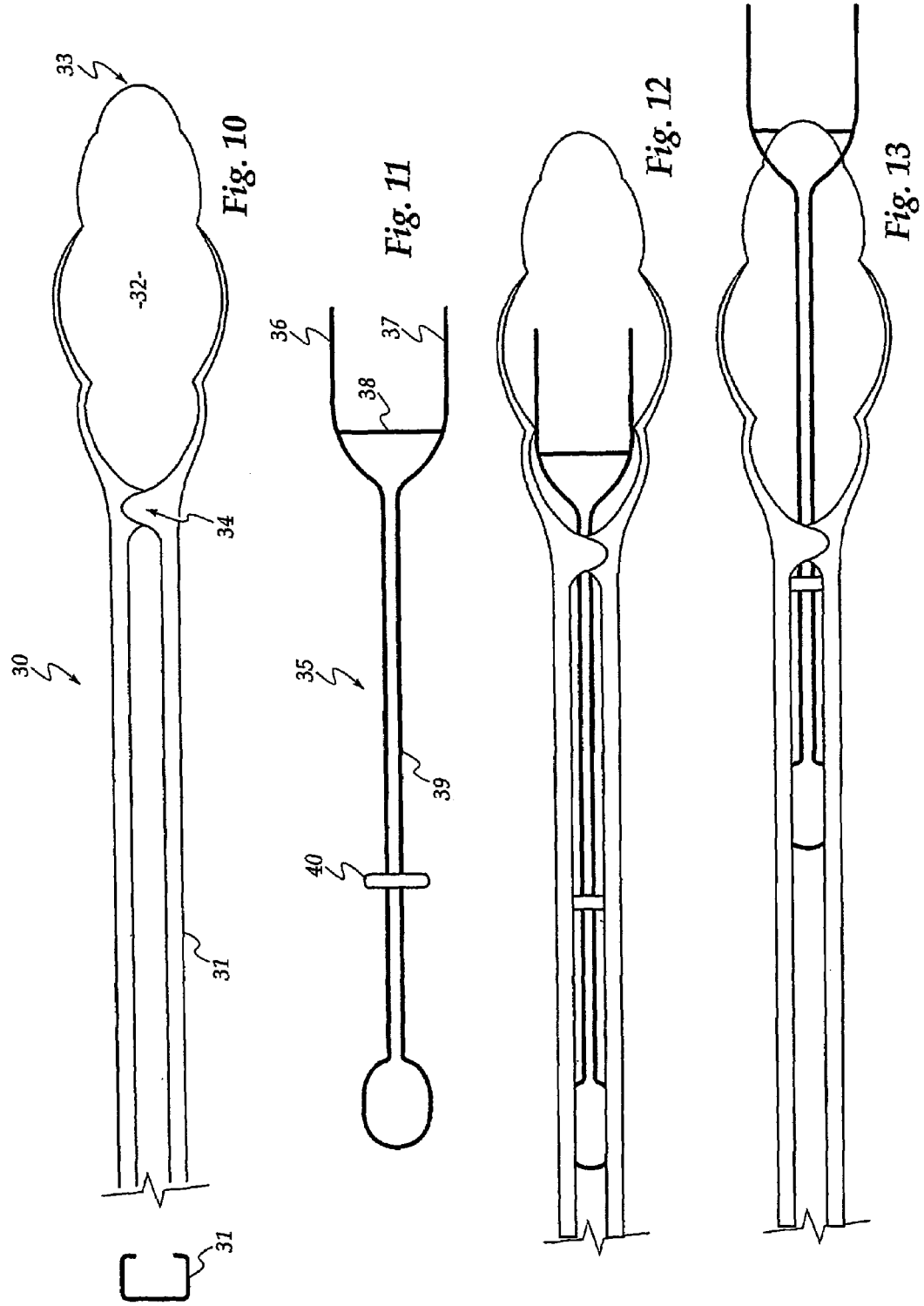

COOKING TOOL ASSEMBLY

TECHNICAL FIELD

This invention relates to a cooking tool assembly.

The invention has particular but not exclusive application to a combination cooking tool having tongs and another cooking tool.

The invention has particular application in one aspect to a combination cooking tool having tongs and either a spatula or a pastry cutter. The invention has particular application in another aspect to a combination cooking tool having tongs and a fork.

BACKGROUND OF INVENTION

Cooking tongs are known. Cooking spatulas such as an eggslice, cooking forks, and pastry cutters are also known.

SUMMARY OF INVENTION

The present invention aims to provide an alternative to known cooking tool assemblies.

This invention in one aspect resides broadly in a cooking tool assembly including:

a first cooking tool comprising tong means having gripping means located at an end of respective arms, the arms being distally pivotted at the other end, and a second cooking tool associated with the tong means proximate the other ends of the arms;

whereby the assembly constitutes a triple-ended reversible bi-functional cooking tool.

As used herein the expression "tong means" is to be construed as being a two membered, distally pivoted, double ended food handling tongs wherein in normal use each member moves or pivots.

In one embodiment the second cooking tool is integral with one arm of the tong means. In another embodiment the second cooking tool is fixed to one arm of the tong means. Alternatively the second cooking tool can be releasably fixed to the tong means.

It is preferred that the arms are connected by hinge means at the other ends thereof. It is also preferred that the second cooking tool has a support shaft slideably receivable within one of the arms whereby the operative length of the second cooking tool is adjustable.

In this embodiment it is preferred that the tong means includes biasing means at the hinged end of the arms, the biasing means being received within the arms for biasing the arms apart, and wherein the support shaft is releasably retained within an arm by the biasing means.

It is also preferred that the arms are substantially channel shape in cross-section, the biasing means being received in the channel and the support shaft being received between the biasing means and the base of the channel.

It is also preferred that the tong means when closed constitutes a handle for the second cooking tool.

In one preferred embodiment the second cooking tool is a spatula.

In another preferred embodiment the second cooking tool is a pastry cutter.

In another preferred embodiment the second cooking tool is a fork.

In another aspect this invention resides broadly in a triple-ended reversible bi-functional cooking tool including:

tong means having gripping means located at an end of respective arms, the arms being distally pivotted at the other end, and a spatula associated with the tong means proximate the other ends of the arms.

In another aspect this invention resides broadly in a triple-ended reversible bi-functional cooking tool including:

tong means having gripping means located at an end of respective arms, the arms being distally pivotted at the other end, and a pastry cutter associated with the tong means proximate the other ends of the arms.

In another aspect this invention resides broadly in a triple-ended reversible bi-functional cooking tool including:

tong means having gripping means located at an end of respective arms, the arms being distally pivotted at the other end, and a fork associated with the tong means proximate the other ends of the arms.

This invention in a further aspect resides broadly in a cooking tool assembly including:

a first cooking tool comprising tong means having gripping means located at an end of respective arms, the arms being distally pivotted at the other end, and a second cooking tool associated with the tong means;

whereby the assembly constitutes a triple-ended bi-functional cooking tool and wherein the second cooking tool is a fork having a shaft slideably receivable within one arm of the tong means.

It is preferred that the fork has bridging means connecting the tines thereof and adapted to be releasably retained by the tip of the gripping means on said one arm of the tong means when the fork is slid outwardly thereof.

It is also preferred that the fork has tab means associated with the shaft of the fork and adapted to be manually actuated to extend and retract the fork within said one arm.

It is also preferred that the tong means includes abutment means on said one arm to prevent the shaft of the fork being completely removed from said one arm.

DESCRIPTION OF DRAWINGS

In order that this invention may be more easily understood and put into practical effect, reference will now be made to the accompanying drawings which illustrate a preferred embodiment of the invention, wherein:

FIG. 10 is an underside view of an arm of tongs;

FIG. 11 illustrates a fork suitable for use in a further aspect of the present invention;

FIG. 12 schematically illustrates the tong/fork of the further aspect of the present invention in withdrawn position;

FIG. 13 schematically illustrates the tong/fork of FIG. 12 in extended position.

DESCRIPTION OF PREFERRED EMBODIMENT OF INVENTION

Figure 1:
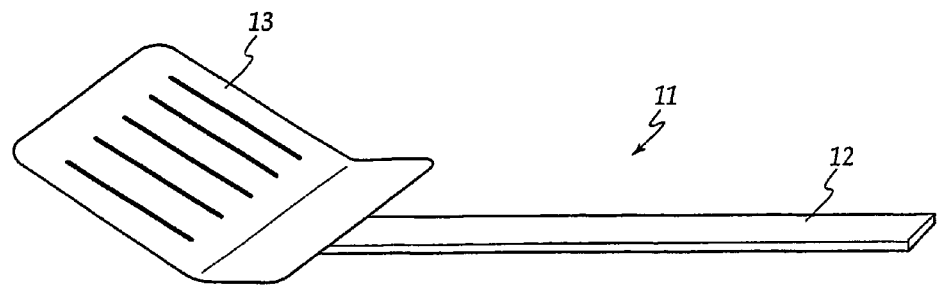
FIG. 1 is a perspective view of an eggslice spatula for use in the invention seen in FIG. 3.
Figure 2:
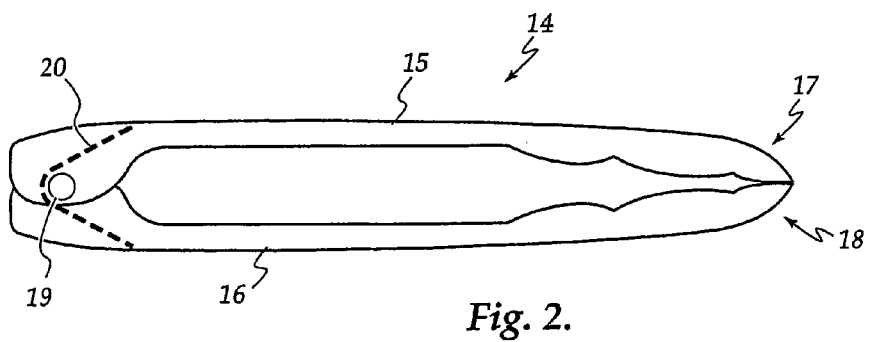
FIG. 2 is a side view view of tongs for use in the invention seen in FIG. 3.
Figure 3:
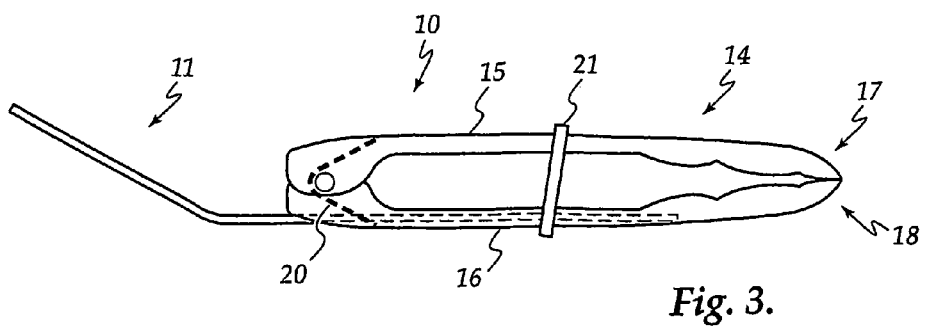
FIG. 3 illustrates the tongs and eggslice cooking tool in one preferred embodiment of the invention.

As can be seen in FIGS. 1 to 3, an eggslice spatula 11 has a shaft 12 supporting spatula 13. Tongs 14 has a pair of arms 15,16 at one end of which are grippers 17,18. The arms are hinged on a pin 19 at the other end and biased apart by a resilient V-shaped spring 20 having opposite arms received within tong arms 15,16 which are channel shaped in cross-section. As seen in FIG. 3, shaft 12 is received in arm 16 and held in place by the spring 20.

Thus cooking tool assembly 10 includes a first cooking tool comprising tong means 14 having gripping means 17,18 located at one end of respective arms 15,16 the arms being distally pivotted at the other end, and second cooking tool (spatula 11 in this embodiment) associated with the tong means 14 proximate the other ends of the arms 15,16 whereby the assembly constitutes a triple-ended reversible bi-functional cooking tool.

It will be appreciated that when closed, the tongs constitutes a handle for the spatula.

Figure 4:
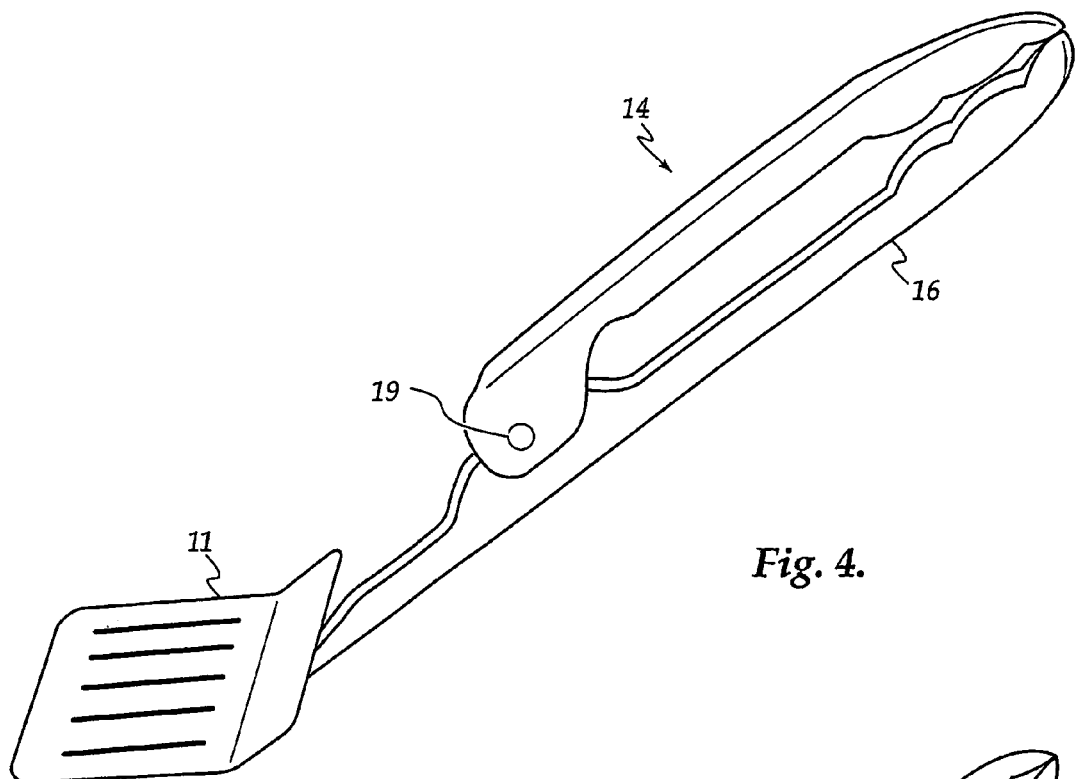
FIGS. 4 to 9 illustrate the tongs and eggslice cooking tool in other preferred embodiments of the invention.
Figure 5:
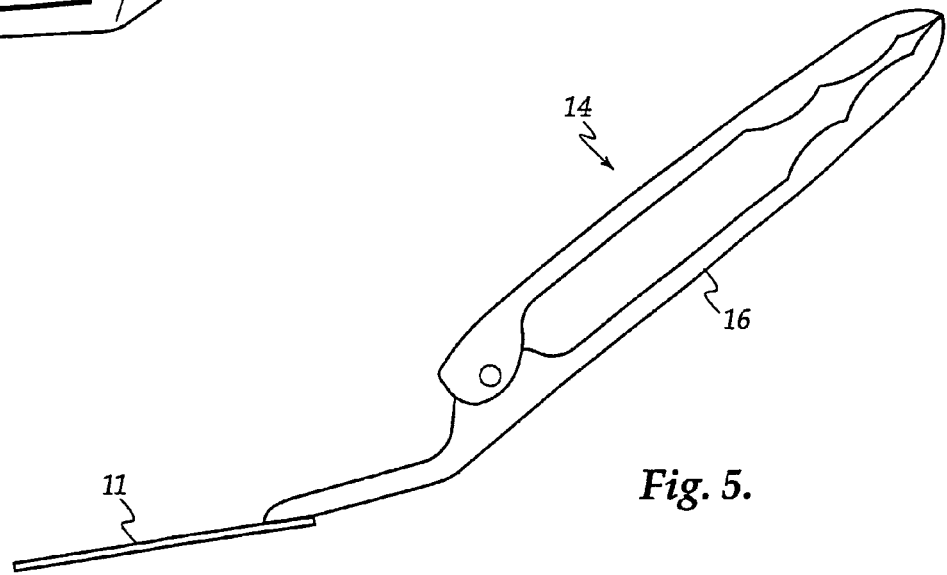

As seen in the embodiments of FIGS. 4 and 5, the second cooking tool (spatula 11) is integral with one arm 16 of the tongs 14 which are hinged at 19. FIGS. 4 and 5 respectively illustrate variations in which the eggslice is bent or angled away from arm 16 either proximate the eggslice or proximate the tongs.

Figure 6:
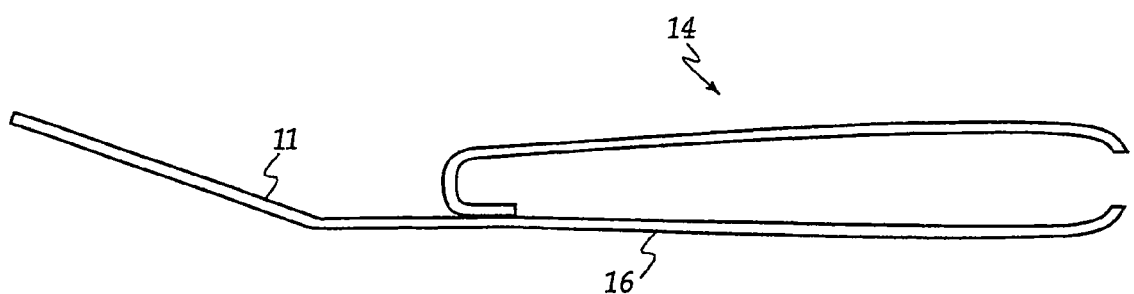
Figure 7:
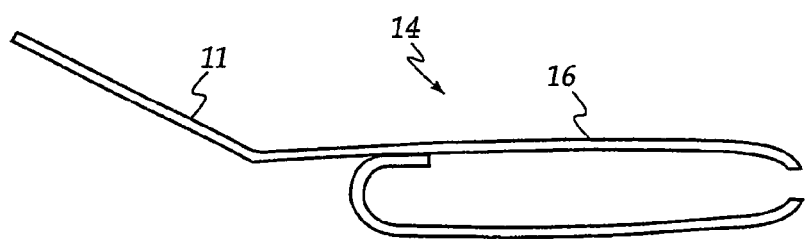

As seen in the embodiments of FIGS. 6 and 7, the second cooking tool (spatula 11) is integral with one arm 16 of the tongs 14 which are not hinged, but rather connected by welding or the like. FIGS. 6 and 7 respectively illustrate variations in which the eggslice is bent or angled away from arm 16 with the embodiment of FIG. 7 being preferred as discussed below.

Food utensil attachments and extensions to the tongs are preferably connected to the tongs arm, as seen in FIG. 6, such that when in use their upper surfaces are directionally the same as the upper pivotally attached tongs member. In this way, fouling of food receptacles or the food itself by the pivotal end of the independent pivotally attached tongs member, as seen in the converse configuration in FIG. 7, is prevented.

Figure 8:
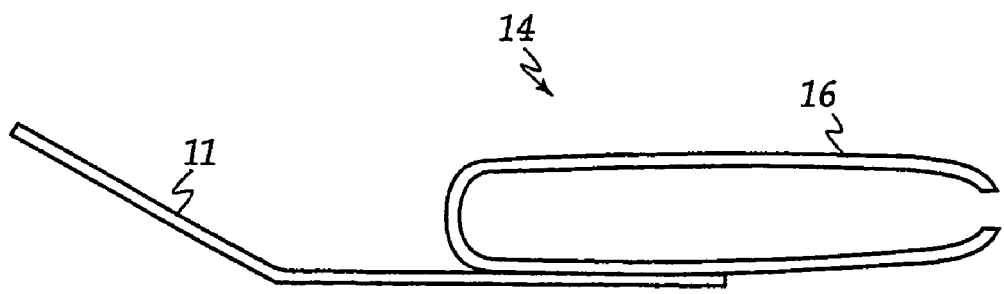
Figure 9:
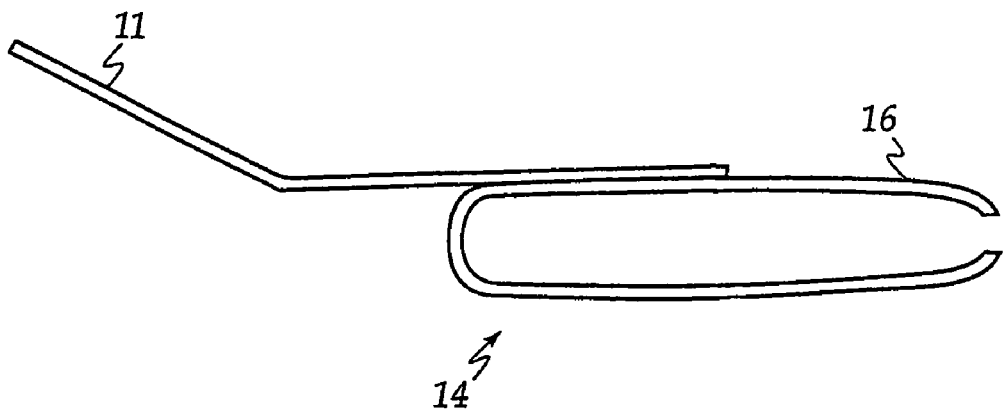

Alternatively as seen in FIGS. 8 and 9 the second cooking tool (spatula 11) is fixed by welding or the like to one arm 16 of the tong means 14 which are not hinged but rather formed as a resilient yoke Alternatively in a manner not shown, the second cooking tool can be releasably fixed to the tong means. A suitable releasable fixing is by means of a capped post on one of the spatula shaft or the tong arm, the capped post being releasably received in a keyhole slot on the other.

Thus one method of effecting attachable/detachable means in respect of adding single member food preparation or handling utensils to a conventional food tongs involves at least two enlarged head rivets with narrowed shank distally spaced along and integrally a part of the shank or handle member of the food utensil and protruding upwardly. Two holes with narrowed slots distally and equivalenty spaced along the lower tongs member receive the rivet heads and lock in place as the two tool members are pushed together and the narrowed rivet shanks engage with the narrowed hole slots.

In the FIG. 1 to 3 embodiment support shaft 12 is slideably receivable within arm 16 and biasing means 20 at the hinged end 19 of the arms 15,16. Biasing means 20 is received within the arms for biasing the arms apart, and support shaft 12 is releasably retained within arm 16 by the biasing means 20. Arms 15,16 are substantially channel shape in cross-section, the biasing means 20 being received in the channel and the support shaft 12 being received between the biasing means 20 and the base of the channel.

As seen in FIG. 3, a locking ring 21 slidable along the closed shafts of arms 17,18 to lock the arms together for storage etc, can be utilised to facilitate the change from one end function to the other.

Another feature (not illustrated) can provide locating means for positively locating spatula shaft 12 within the arm of the tongs. This locating means can be an eyelet closely received within a channel-shaped arm to snugly hold the shaft end. A pop rivet in the eyelet can bear against the channel base to substantially prevent movement of the spatula in a direction up and down from the tongs when used as the spatula handle.

It will be appreciated that although an eggslice spatula has been described and illustrated as the second tool, other tools are suitable. In particular a pastry cutter such as a roller cutting blade can be utilised.

The tool can be made from any suitable material such as plastic or can be stamped from stainless steel.

FIGS. 10–13 illustrate a further aspect of the present invention which incorporates a fork.

As can be seen in FIG. 10, an arm 30 of a pair of tongs has a C-shaped shaft section 31 with a conventional gripper 32 having a tip 33. The flanges of the C-shaped shaft 31 extend toward each other adjacent gripper 33 to define a neck 34. FIG. 11 shows a fork 35 with two tynes 36,37 connected by a bridge 38 and extending from a shaft 39. A tab 40 is connected to shaft 39 such that fork 35 can be moved in and out of shaft 31 by gripping tab 40. As can be seen in FIG. 13, neck 34 abuts tab 40 to prevent the fork shaft 39 being completely withdrawn from within tong arm shaft 31. The tip of gripper 32 locates and locks under bridge 38 on fork 35 to define the outwardmost position of fork 35.

The cooking tool of this further embodiment can be made from any suitable material such as plastic or can be stamped from stainless steel. The fork is preferably made from suitably bent metal rod.

The invention thus constitutes a reversible food handling tongs with optional fixed or interchangeable, length adjustable, reverse end functions.

It will be appreciated that the attachment or extension constituting the second cooking tool can be made to either arm of the two arm tong means, to constitute a two membered triple-ended bifunctional food utensil. It will also be appreciated that only one of the tong arms need to pivot in relation to the other and consequently the other arm can extend beyond the pivot to an extended separate usable end. Given sufficient length in the tong arms to minimise the effects of heating and oil transfer, the tong arms can constitute a composite "mid-located" handle common to each functional end, either locked or freely pivoting.

In certain embodiments the pivoting tongs is attached in the same plane as the second utensil. In use this avoids fouling of the periphery or rim of food containers. This is particularly relevant in the case of an angled spatula-like food lifter. This effect can also be provided by sharply angling the second utensil, or providing it with sufficient length or by changing its plane of operation by twisting its shaft or shank.

Similarly in the case of a rotary pizza cutter, additional strength and stability may be provided by aligning the planes of use of the tongs and the cutter.

Figure 14A:
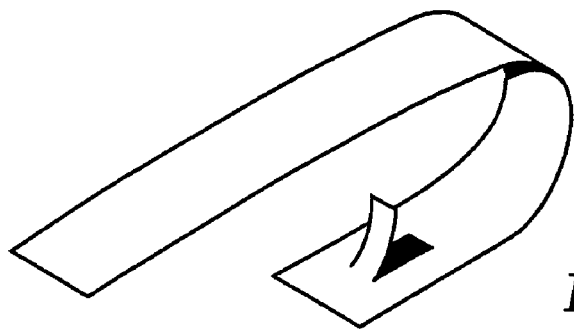
FIGS. 14A, 14B and 14C illustrate various spring arrangements to provide differential bias to the tong arms.
Figure 14B:
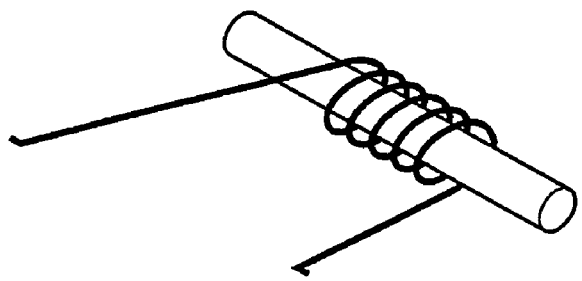
Figure 14C:
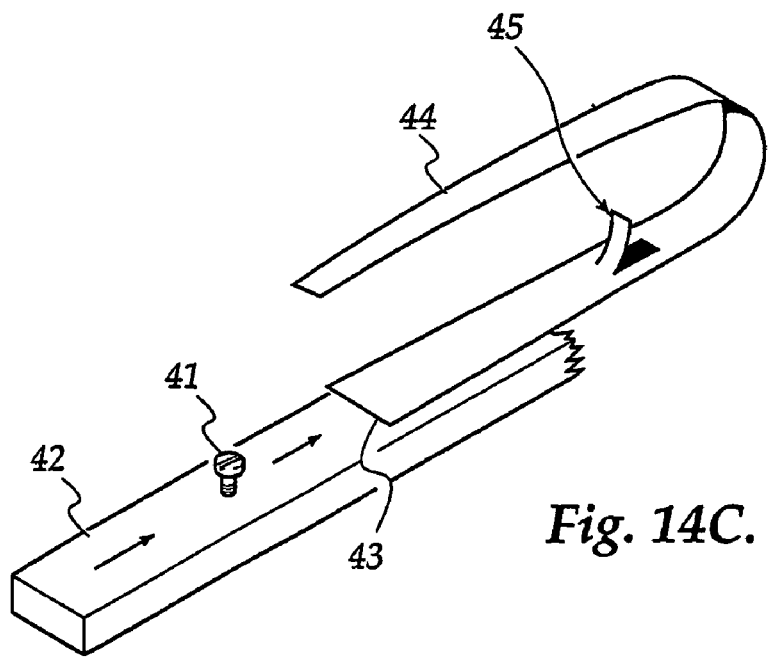

It will also be appreciated that various spring configurations can be utilised to promote maximum pivoting movement of one tong arm rather than the other. If the extended tong arm, ie the arm carrying the second utensil, is arranged in use to move less than the other, this can enhance safety and the controlled and comfortable use of the appliance. Suitable spring configurations at the distally pivoted end of the tong arms include a variable length flat spring as seen in FIG. 14A, a coil spring having unequal bearing extensions as seen in FIG. 14B and a tapered flat spring as seen in FIG. 14C.

FIG. 14 C also illustrates some safety features which can be incorporated in the present invention. A stud or stopper 41 on the shaft or shank 42 of the second utensil engages with the end 43 of flat spring 44 to limit sliding movement of the second utensil. A raised tag 45 on flatspring 44 is arranged to engage with the pivot spindle of the tongs (not shown) to prevent the flat spring becoming disengaged from the tongs if accidentally pushed out when the second utensil is attached.

The invention has a number of advantages over known food preparation tools in relation to efficiency of use, storage and manufacture. Reducing the number of tools used reduces tool locating and changing times as well as the chance of misplacement with obvious advantages in time and stress savings both in commercial food preparations situations and in domestic applications, especially camping holidays where storage space is limited, surroundings unfamiliar and lighting often poor.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

The invention claimed is:

1. A substantially elongate triple-ended reversible bi-functional cooking tool assembly having two ends and including:
   a first cooking tool comprising tongs each having a grip located at a first end of respective arms of substantially equal length, the arms being pivoted by a hinge at an end of each arm distal to the grips whereby food may be gripped by the tongs during cooking, and
   a second cooking tool operatively associated with the tongs proximate the pivoted distal ends of the arms to form a bi-functional cooking tool assembly which has two tong grips at a first end thereof and the second cooking tool at a second end thereof such that bi-functionality of use is effected by a user reversibly gripping the cooking tool assembly between the ends thereof;
   wherein the second cooking tool has a support shaft slideably receivable within one of the arms whereby the operative length of the second cooking tool is adjustable.

2. A cooking tool assembly as claimed in claim 1, wherein the tongs include a biasing member at the hinged end of the arms, the biasing member being received within the arms and biasing the arms apart, and wherein the support shaft is releasably retained within an arm by the biasing member.

3. A cooking tool assembly as claimed in claim 2, wherein the arms are substantially channel shape in cross-section, the biasing member being received in the channel and the support shaft being received between the biasing member and the base of the channel.

4. A substantially elongate cooking tool assembly including:
   a first cooking tool comprising tongs each having a grip located at an end of respective arms of substantially equal length, the arms being pivoted at second ends distal to the grips whereby food may be gripped by the tongs during cooking, and
   a second cooking tool operatively associated with the tongs to form a bi-functional cooking tool assembly which has two tong grips at a first end and the second cooking tool at a second end thereof such that bi-functionality of use is effected by a user reversibly positioning the second cooking tool between the ends of the cooking tool assembly or exterior to the first end thereof;
   whereby the assembly constitutes a triple-ended reversible bi-functional cooking tool and wherein the second cooking tool is a fork having a shaft slideably receivable within one arm of the tongs.

5. A cooking tool assembly as claimed in claim 4, wherein the fork has tines and a bridge connecting the tines, the bridge being releasably retained by the grip on said one arm of the tongs when the fork is slid outwardly thereof.

6. A cooking tool assembly as claimed in claim 5, wherein the fork has a tab associated with the shaft of the fork and is manually actuated to extend and retract the fork within said one arm.

7. A cooking tool assembly as claimed in claim 6, wherein the tongs include an abutment on said one arm engageable by said tab to prevent the shaft of the fork being completely removed from said one arm.

* * * * *